(12) United States Patent
Wang et al.

(10) Patent No.: US 9,409,461 B2
(45) Date of Patent: Aug. 9, 2016

(54) AIR STREAM VELOCITY CONTROL FOR VENTILATION SYSTEM

(75) Inventors: Mingyu Wang, Amherst, NY (US);
Prasad S. Kadle, Williamsville, NY (US); Debashis Ghosh, Amherst, NY (US)

(73) Assignee: MAHLE International GmbH, Stuttgart (DE)

( * ) Notice: Subject to any disclaimer, the term of this patent is extended or adjusted under 35 U.S.C. 154(b) by 1011 days.

(21) Appl. No.: 13/528,968

(22) Filed: Jun. 21, 2012

(65) Prior Publication Data
US 2013/0344791 A1 Dec. 26, 2013

(51) Int. Cl.
*B60H 1/34* (2006.01)
*B60H 1/00* (2006.01)

(52) U.S. Cl.
CPC ........ *B60H 1/00742* (2013.01); *B60H 1/00828* (2013.01)

(58) Field of Classification Search
CPC .. B60H 1/00828; B60H 1/00871; B60H 1/34; B60H 1/3414
USPC .......................... 454/143, 153, 154, 155, 162
See application file for complete search history.

(56) References Cited

U.S. PATENT DOCUMENTS

| | | | | |
|---|---|---|---|---|
| 2,191,208 A | * | 2/1940 | Woodling | 236/44 B |
| 5,145,112 A | * | 9/1992 | Ueda | 236/49.3 |
| 5,172,865 A | * | 12/1992 | Takano et al. | 239/408 |
| 5,180,333 A | * | 1/1993 | Shyu | 454/319 |
| 5,187,943 A | * | 2/1993 | Taniguchi et al. | 62/180 |
| 5,291,748 A | | 3/1994 | Ueda | |
| 5,449,275 A | | 9/1995 | Gluszek et al. | |
| 5,573,269 A | * | 11/1996 | Gentry | G01G 19/4142 177/144 |
| 5,603,226 A | | 2/1997 | Ishikawa et al. | |
| 6,454,178 B1 | * | 9/2002 | Fusco et al. | 236/49.3 |
| 7,255,161 B2 | * | 8/2007 | Durach et al. | 165/202 |
| 2008/0248736 A1 | * | 10/2008 | Aoki et al. | 454/75 |
| 2008/0256967 A1 | | 10/2008 | Errington | |

FOREIGN PATENT DOCUMENTS

| | | |
|---|---|---|
| DE | 10 2008 018 397 A1 | 10/2009 |
| EP | 1 070 626 A2 | 1/2001 |
| EP | 2 305 499 A1 | 4/2011 |

OTHER PUBLICATIONS

Paper No. 2012-01-0641 Entitled "Energy Efficient Hvac System with Spot Cooling in an Automobice—Design and CFD Analysis," by Debashis Ghosh et al., Published Apr. 16, 2012, pp. 1-27.
European Patent Office, Munich, Germany, European Search Report and Search Opinion of European Patent Application No. 13 17 3101, dated Sep. 23, 2013, 4 pages.

* cited by examiner

*Primary Examiner* — Gregory Huson
*Assistant Examiner* — Dana Tighe
(74) *Attorney, Agent, or Firm* — Brinks Gilson & Lione (57) ABSTRACT

A system and a method of controlling a ventilation or HVAC system that is configured to provide an air stream having a comfortable contact velocity to an occupant seated in a vehicle cabin. The system includes a sensor to determine the distance from a discharge nozzle to the vehicle occupant and a controller to control the exit velocity and/or an effective diameter of the nozzle. The sensor may use ultrasonic, infrared, LIDAR, or RADAR technology to determine distance. The system may determine the distance from the nozzle to the occupant based on a seat location determined by a seat location sensor. The seat location sensor may be common to an inflatable restraint (air bag) system.

13 Claims, 4 Drawing Sheets

AIR STREAM VELOCITY CONTROL FOR VENTILATION SYSTEM

TECHNICAL FIELD OF INVENTION

The present disclosure relates to a ventilation system; more specifically to a ventilation system in a vehicle configured to provide an air stream directed toward a vehicle occupant, wherein the air stream establishes a comfortable contact velocity as it impinges on the vehicle occupant.

BACKGROUND OF INVENTION

It may be desirable to direct an air stream from a ventilation system toward a person in order to provide comfortable heating or cooling to the person. This may be more easily implemented when the person is in a known location, such as when seated in a vehicle cabin. This directed air stream is sometimes referred to as spot conditioning. As used herein, spot conditioning means directing a stream of air at a specific temperature and flow rate toward a thermally sensitive portion of a person's body to provide a heat supply rate to the sensitive portion that is equivalent to the heat loss rate at a comfortable temperature.

To provide a heat supply rate using a small air stream, such as an air stream typically used for spot conditioning, a higher velocity air stream may be desired to compensate for a smaller air stream volume. However, it has been observed that there is an upper limit on the velocity of the air stream contacting the person at which the person will feel comfortable, typically about 1 meter per second. Therefore, in order to provide a comfortable air stream, the air stream velocity may be controlled so that it provides the desired heat supply rate, but is limited to provide a conformable contact velocity. As used herein, the comfortable contact velocity is the maximum velocity for the air stream impinging on the body of a person at which the person would feel comfortable. It has also been observed that the velocity of an air stream varies in relation to the distance from the source of the air stream. Therefore, the distance between the air stream source and the person contacted by the air stream may need to be determined in order to provide a comfortable air stream contact velocity at the point at which the air stream contacts the person.

SUMMARY OF THE INVENTION

In accordance with one embodiment of this invention, a ventilation system configured to provide an air stream is provided. The ventilation system includes a nozzle configured to direct the air stream toward a vehicle occupant seated in a vehicle cabin. The system also includes a controller configured to control a nozzle velocity of the air stream to establish a comfortable contact velocity. The system further includes a sensor configured to determine a distance between the nozzle and the vehicle occupant. The sensor is in communication with the controller. The system may include a plurality of nozzles configured to direct a plurality of air streams toward the vehicle occupant.

In another embodiment of the present invention, the sensor may be configured to determine the distance between the nozzle and the vehicle occupant based on a seat location.

In another embodiment of the present invention, the sensor may be configured to determine the distance between the nozzle and the vehicle occupant based on waves emitted from the sensor and reflected from the vehicle occupant. The waves emitted by the sensor may be ultrasonic waves or electromagnetic waves.

In another embodiment of the present invention, the system may further include a servo mechanism that is coupled to the nozzle. The servo mechanism is in communication with the controller. The servo mechanism may be configured to articulate the nozzle in order to direct the air stream in a direction determined by the controller. The air stream may be directed toward a sensitive portion of a body of the vehicle occupant that is more sensitive to heat loss than other portions of the body. The controller may be configured to identify the sensitive portion, determine a location of the sensitive portion, and operate the servo mechanism to articulate the nozzle in order to direct the air stream to the location of the sensitive portion.

In another embodiment of the present invention, a vehicle ventilation system is provided. The vehicle ventilation system includes a nozzle operable to direct an air stream toward a vehicle occupant seated in a vehicle cabin, a sensor configured to determine a distance between the nozzle and the vehicle occupant, and a controller configured to control a nozzle velocity of the air stream based on the distance to establish a comfortable contact velocity for the vehicle occupant.

In yet another embodiment of the present invention, a method of controlling a ventilation system to provide an air stream is provided. The method includes the steps of providing a nozzle configured to direct the air stream, determining a distance between the nozzle and a vehicle occupant, and operating the nozzle to direct the air stream toward the vehicle occupant. The air stream is characterized as having a nozzle velocity that is effective to establish a comfortable contact velocity. The step of determining the distance between the nozzle and the vehicle occupant may be based on a seat location. The method may further include the steps of articulating the nozzle in order to direct the air stream toward a sensitive portion of a body of the vehicle occupant that is more sensitive to heat loss than other portions of the body, identifying the sensitive portion, determining a location of the sensitive portion, and articulating the nozzle in order to direct the air stream toward the location of the sensitive portion.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
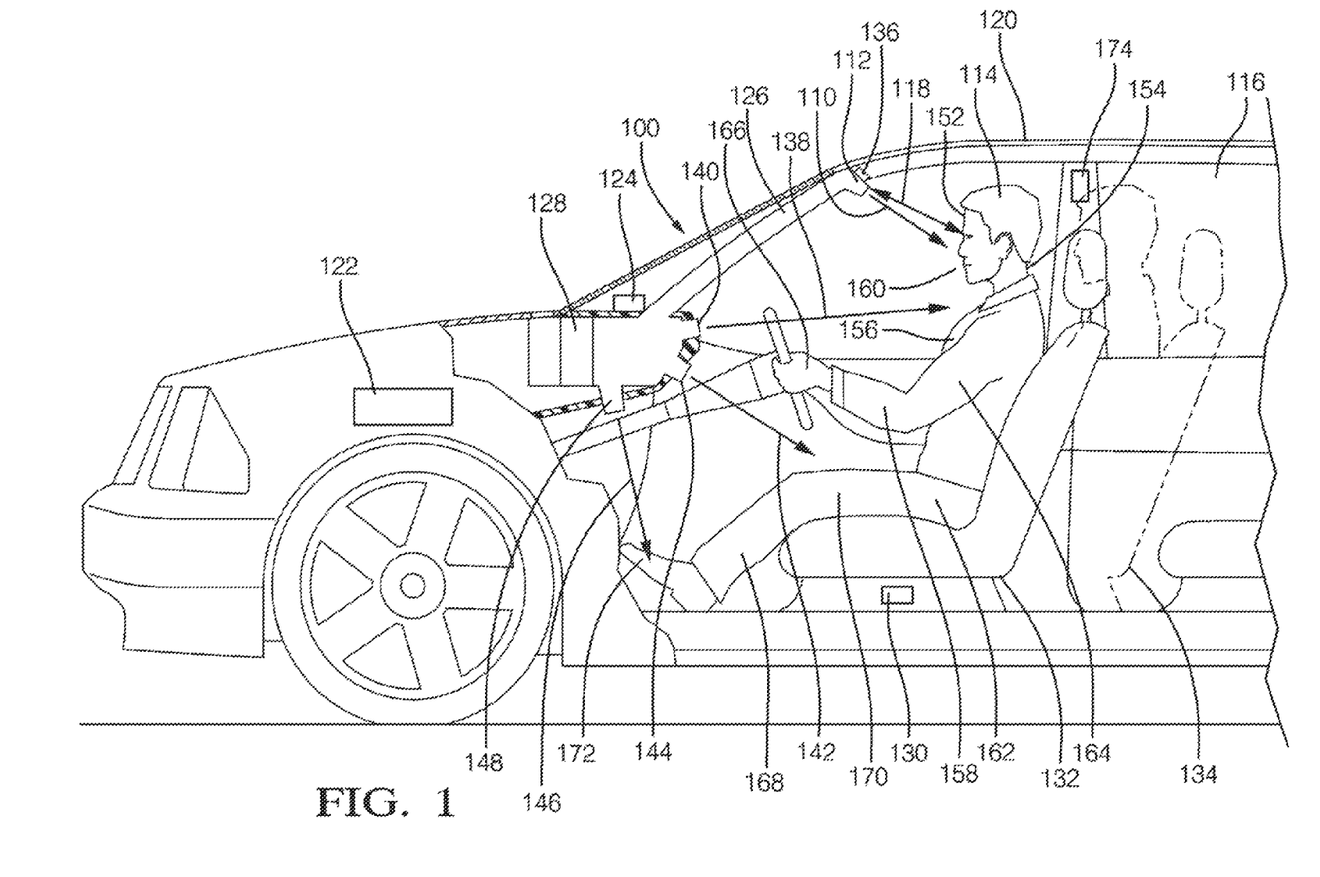
FIG. 1 is a cutaway side view diagram of a vehicle equipped with a ventilation system in accordance with one embodiment.

FIG. 1 illustrates a non-limiting example of a ventilation system 100 that is configured to provide an air stream 110 directed toward a vehicle occupant 114 seated in a cabin 116 of a vehicle 120. The ventilation system 100 may provide a heated and/or cooled air stream, such as in a heating, ventilation, and air conditioning (HVAC) system. The system 100 includes a nozzle 112 that is configured to direct the air stream 110 from the ventilation system 100 toward the vehicle occupant 114 seated in the cabin 116. As used herein, a nozzle is a discrete structure configured to form and direct a stream of air that has been pressurized by an air movement device. The air stream 110 may be directed by articulating the entire nozzle 112. Alternatively, the air stream 110 may be directed by articulating vanes disposed within the nozzle 112. The nozzle 112 or vanes may be configured to be manually or automatically directed toward the vehicle occupant 114. The system 100 also includes a controller 122 that is configured to control a nozzle velocity of the air stream 110 and/or an effective diameter 20 of the nozzle 112 to establish a comfortable contact velocity. The system 100 further includes a sensor 124 configured to determine a distance 118 between the nozzle 112 and the vehicle occupant 114. The sensor 124 may determine data regarding the location of the vehicle occupant 114 that allows the controller 122 to determine the distance 118 between the nozzle 112 and the vehicle occupant 114. The sensor 124 is in communication with the controller 122.

The system 100 may include an air plenum 126 that is configured to direct air to the nozzle 112. The air may be heated or cooled by a heat exchanger 128, such as an evaporator, a heater core, or a thermoelectric device included within the system 100. Alternatively, the system 100 may include a thermoelectric device that is disposed in proximity to the nozzle 112. The thermoelectric device may be configured to heat or cool air drawn through the system 100. The system 100 may further include an air movement device, such as a fan, to force air from the cabin 116 or from outside of the vehicle 120 through the nozzle 112. The controller 122 may control the speed of the fan to control the nozzle velocity. Alternatively, or in addition, the controller 122 may control the size of an adjustable orifice or iris disposed within the nozzle 112 to control an effective diameter of the nozzle 112, thereby controlling the nozzle velocity. Methods and apparatus for controlling the nozzle velocity of a ventilation system 100 are well known to those skilled in the art.

Providing the air stream 110 at a higher nozzle velocity may provide the benefit of delivering the desired heat supply rate at lower temperature (for heating) or higher temperature (for cooling) than may be required for a lower nozzle velocities. This may provide a benefit of allowing a lower operating temperature (for heating) or a higher operating temperature (for cooling) for the heat exchanger or thermoelectric device which may relax design specifications and part cost for these components.

An air stream 110 with a higher velocity may provide a desired heat supply rate to the vehicle occupant 114 using smaller nozzles and plenums, beneficially reducing the size of the nozzle 112 and the air plenum 126, if required, and simplifying the packaging requirements for these components in the vehicle 120. As used herein, the desired heat supply rate provides heating when it is positive in value, and supplies cooing when it is negative in value.

The nozzle velocity may be limited by the comfortable contact velocity. A comfortable contact velocity is typically limited to less than 1 meter per second. However, the value of the comfortable contact velocity may vary based on a thermal sensitivity of the portion of the vehicle occupant's body that air stream 110 is contacting and whether the portion has exposed skin, e.g. the face or the portion is covered by clothing, e.g. the feet. The comfortable contact velocity may also be dependent on a temperature of the air stream 110. The maximum velocity of the air stream 110 decreases according to the distance 118 that it has traveled from the nozzle 112 of the ventilation system 100. Therefore, by determining the distance 118 between the nozzle 112 and the vehicle occupant 114, the velocity of the air stream 110 may be controlled to provide a desired contact velocity when the air stream 110 impinges on the vehicle occupant 114.

Figure 2:
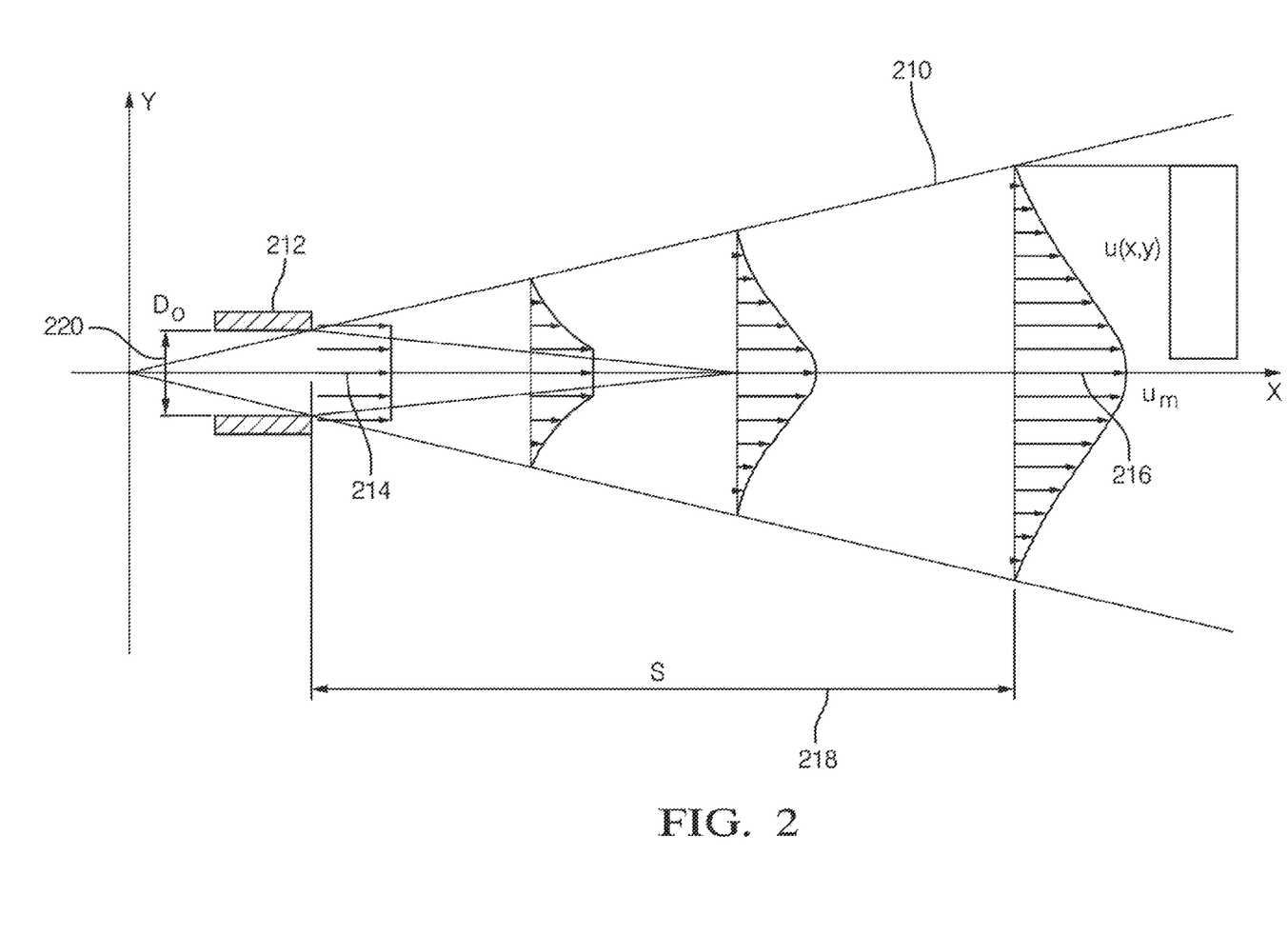
FIG. 2 is a diagram of a velocity profile of an air stream exiting a nozzle in accordance with one embodiment.

FIG. 2 illustrates a velocity profile of an air stream 210 exiting a nozzle 212. The nozzle velocity 214 (U0) is the velocity of the air stream 210 as it leaves the nozzle 212. The contact velocity 216 (Um), is the maximum velocity of the air stream 210, typically at the center of the air stream 110, at the distance 218 (S) from the nozzle 212. Without prescribing to any particular theory, the contact velocity 216 may be a function of the nozzle velocity 214, the effective diameter 220 (D0) of the nozzle 212, and the distance 218 from the nozzle 112. This relationship for a round nozzle may be expressed by the following equation, with a similar relationship for other nozzle shapes:

$$Um = U0(0.966/((0.075 S/D0) + 0.294))  \qquad \text{Eq. 1.}$$

Accordingly, a desired contact velocity 216 for the air stream 210 may be provided by controlling the nozzle velocity 214 and/or the effective nozzle diameter 220 to provide the desired contact velocity 216 at the distance 218 so that it provides a comfortable contact velocity 216. The relationship between the nozzle velocity 214 and the contact velocity 216 as expressed in Eq. 1 assumes a free jet stream The equivalent diameter 220 for a nozzle 212 with a circular discharge portion is the actual diameter of the nozzle 212. The equivalent diameter 220 for a nozzle 212 with a shape that is other than circular is 4 times the area of the nozzle 212 divided by the perimeter of the nozzle 212, also known as the hydraulic diameter.

Referring again to FIG. 1, as a non-limiting example, the sensor 124 may be a seat location sensor 130 that is configured to determine the distance 118 between the nozzle 112 and the vehicle occupant 114 based on a seat location. The seat location sensor 130 may determine a seat location in the vehicle 120 by determining the location of the seat relative to a seat track of an adjustable seat, such as those typically used in a driver seat and/or front passenger seat of motor vehicles. The seat location sensor 130 may then communicate the seat position to the controller 122. The controller 122 may be configured to determine the distance 118 between the nozzle 112 and the vehicle occupant 114 based on the seat location indicated by the seat location sensor 130. The seat location sensor 130 may be a magnetic sensor, such as those manufactured by Allegro MicroSystems of Worchester, Mass. or a resistive sensor, such as those produced by CTS Automotive Products of Elkhart, Ind.

Seat location sensors are currently used in vehicles with inflatable restraint systems, e.g. air bag system. Therefore, utilizing the seat location sensor 130 to determine the distance 118 from the nozzle 112 to the vehicle occupant 114 may provide a cost and vehicle packaging advantage by using a common sensor for both the ventilation system 100 and the inflatable restraint system. The cost and packaging space required to provide a sensor for each system may thereby be reduced.

The controller 122 may be configured to determine that a seat has moved from a first seat location 132 to a second seat location 134 when the seat location sensor 130 detects that the seat has changed location. The controller 122 may then determine a second distance between the nozzle 112 and the vehicle occupant 114 based on the second seat location 134. The controller 122 may then adjust the nozzle velocity and/or effective diameter 20 of the nozzle 112 to establish a comfortable contact velocity for the vehicle occupant 114 at the second seat location 134.

As another non-limiting example, the sensor 124 may be configured to determine the distance 118 between the nozzle 112 and the vehicle occupant 114 based on waves emitted from the sensor 124 and reflected from the vehicle occupant 114. The sensor 124 may receive the reflected waves and may determine the distance 118 between the sensor 124 based on time between emission and reception or strength of the reflected waves received be the sensor 124. The sensor 124 may be an ultrasonic distance sensor that utilizes the transmission and reflection of ultrasonic sound waves to determine the distance 118 between the nozzle 112 and the vehicle occupant 114. The sensor 124 may alternatively use the transmission and reflection of electromagnetic waves, such as infrared, visible laser light (LIDAR) or radio waves (RADAR). The methods and apparatuses for determining distance using ultrasonic, infrared, LIDAR and RADAR sensors are well known to those skilled in the art.

The sensor 124 may determine the distance 118 between the sensor 124 and the vehicle occupant 114. The controller 122 may then determine the distance 118 between the nozzle 112 and the vehicle occupant 114 based on a known positional relationship between the sensor 124 and the nozzle 112. Alternatively, the sensor 136 may be mounted on or near the nozzle 112 and may measure the distance 118 directly.

As illustrated in FIG. 1, the system 100 may provide a plurality of air streams 110, 138, 142, 146 directed by a plurality of nozzles 112, 140, 144, 148. The nozzles 112, 140, 144, 148 may be located at different distances from the vehicle occupant 114 and may be directed to different portions of the body of the vehicle occupant 114. As a non-limiting example, the nozzle 112 may be a first nozzle 112, the air stream 110 may be a first air stream 110, the distance 118 may be a first distance, the nozzle velocity may be a first nozzle velocity, and the comfortable contact velocity may be a first comfortable contact velocity. The system 100 may further include a second nozzle 140, 144, 148 that is configured to direct a second air stream 138, 142, 146 toward the vehicle occupant 114. The sensor 124 may be configured to determine a second distance between the second nozzle 140, 144, 148 and the vehicle occupant 114. The controller 122 may be configured to control a second nozzle velocity to establish a second comfortable contact velocity. The first comfortable contact velocity may be distinct from the second comfortable contact velocity.

Figure 3:
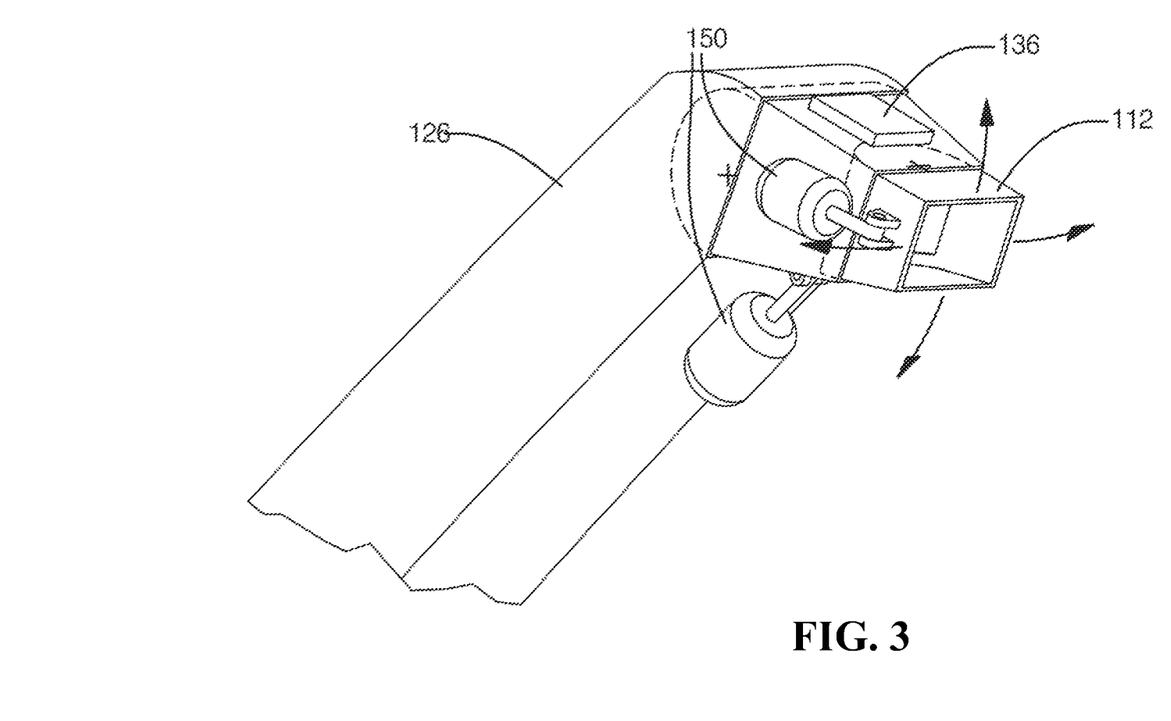
FIG. 3 is a side view of a nozzle and a servo mechanism of a ventilation system in accordance with one embodiment.

FIG. 3 illustrates a non-limiting example of the system 100 having a nozzle 112 including a servo mechanism 150 that is coupled to the nozzle 112 and is in communication with the controller 122. The servo mechanism 150 may be configured to articulate the nozzle 112 in order to direct the air stream 110 in a direction determined by the controller 122. As used herein, articulate refers to moving the nozzle 112 in one or more axes in order to direct the air stream 110. The nozzle 112 may have freedom of movement in one or preferably two axes, such as when mounted in a gimbal device. The nozzle 112 may also be configured to move fore and aft, that is to extend and retract as well as move up/down and right/left in order to adjust the distance 118 between the nozzle 112 and the vehicle occupant 114. The servo mechanism 150 may include a servo motor with a ball and screw drive or a stepper motor. Alternatively, the servo mechanism may be coupled to vanes disposed within the nozzle and may move the vanes in order to direct the air stream 110 in a direction determined by the controller 122. The servo mechanism 150 may be configured to maintain direction of the air stream 110 to the desired location, such as a specific portion of the body of the vehicle occupant 114 rather than sweep the air stream 110 over various portions of the body of the vehicle occupant 114.

It has been observed that different portions or areas of a human body have different sensitivity to heat loss caused by the ambient temperature. For example, the human face is relatively insensitive to cold ambient temperatures within a reasonable range, while other body portions, such as feet have higher sensitivity to cold ambient temperatures. Therefore, it may be advantageous to direct the air stream 110 to portions of the vehicle occupant's body that are most thermally sensitive, as a non-limiting example for providing spot conditioning as shown U.S. patent application Ser. Nos. 13/442, 961, 61/479,425, and 61/499,312. The entire disclosure of application Ser. Nos. 13/442,961, 61/479,425, and 61/499, 312 are hereby incorporated herein by reference. As used herein, spot conditioning means directing a stream of air at a specific temperature and flow rate toward a sensitive portion of the vehicle occupant's body to provide a heat loss rate for the sensitive portion equivalent to the heat loss rate at a comfortable temperature.

A model of a human body identifying thermal sensation and thermal sensitivity of various body portions to temperature has been developed to determine which body portions to heat or cool to achieve thermal comfort through spot conditioning. As an illustrative example, the static local sensation equation by Zhang et al. ["Thermal Sensation and Comfort Models for Non-Uniform and Transient Environments: Part I: Local Sensation of Individual Body Parts", Indoor Environmental Quality (IEQ), Center for the Built Environment, Center for Environmental Design Research, University of California—Berkeley, 2009] may be used to determine the sensitivity of body portions to localized heating or cooling.

As illustrated by both FIG. 1 and FIG. 3, the air stream 110 may be directed toward a sensitive portion of a body of the vehicle occupant 114 that is more sensitive to heat loss than other portions of the body. The controller 122 may be configured to identify the sensitive portion, determine a location of the sensitive portion, and operate the servo mechanism 150 to articulate the nozzle 112 in order to direct the air stream 110 to the location of the sensitive portion.

Referring again to FIG. 1, the controller 122 may include a microprocessor or application specific integrated circuit (ASIC) configured to control the system 100. Software that configures the microprocessor or ASIC to control the system 100 may be stored in non-volatile (NV) memory within the controller 122. Non-limiting examples of the types of NV memory that may be used include electrically erasable programmable read only memory (EEPROM), masked read only memory (ROM) and flash memory. The controller 122 may also include analog to digital (A/D) convertor circuits and digital to analog (D/A) convertor circuits to allow the convertor to establish electrical communication with the sensor 124, servo mechanism 150 and other electronic devices.

The software stored within the controller 122 may also include instructions that, when executed, cause the controller 122 to identify a sensitive portion of a body of the vehicle occupant 114 that is more sensitive to heat loss, e.g. a forehead portion 152, than other portions of the body, e.g. a foot portion 172. The sensitive portion identified may depend whether the vehicle occupant 114 is in a high ambient temperature environment where the heat loss rate needs to be increased to maintain comfort, that is the system 100 is providing cooling of the vehicle occupant 114 or in a lower ambient temperature environment where the heat loss rate needs to be lowered in order to maintain comfort, that is the system 100 is providing heating to the vehicle occupant 114.

In a non-limiting example, in a higher ambient temperature environment, e.g. greater than 24° C., the sensitive portion may be, in order of decreasing sensitivity, a forehead portion 152, a neck portion 154, a chest portion 156, a lower arm portion 158, a face portion 160, a pelvis portion 162, an upper arm portion 164, a hand portion 166, a lower leg portion 168, a thigh portion 170, or a foot portion 172. In another non-limiting example, in a lower ambient temperature environment, e.g. less than 24° C., the sensitive portion may be, in order of decreasing sensitivity, a forehead portion 152, a neck portion 154, a chest portion 156, a lower arm portion 158, an upper arm portion 164, a lower leg portion 168, a foot portion 172, a pelvis portion 162, a hand portion 166, a thigh portion 170, or a face portion 160.

The identification of sensitive body portions may be based upon models of the human body such as the Human Thermal Comfort Model developed by Zhang et al., ibid to determine thermal comfort sensitivity of body portions to the ambient temperature. The controller 122 may include a database of the temperature sensitivity of various body portions stored in the memory of the controller 122.

The controller 122 may be configured to determine an ambient temperature of the vehicle cabin 116. The system 100 may include a temperature sensor 174 that is disposed within the vehicle cabin 116. The controller 122 may be in electrical communication with the temperature sensor 174.

The controller 122 may be configured to determine a location of the sensitive portion within the vehicle cabin 116. The controller 122 may include a database of location information of the sensitive body portions in relation to the nozzle 112, as a non-limiting example azimuth and distance information. The controller 122 may utilize this location information to command the servo mechanism 150 to direct the nozzle 112 to deliver the air stream 110 to a sensitive portion of the body of the vehicle occupant 114. The location information may be generalized so that the location information encompasses the location of the sensitive portion of a female occupant in the $10^{th}$ percentile of height and a male occupant in the $90^{th}$ percentile of height.

The controller 122 may be configured to determine the location of the sensitive portion based on the seat position indicated by the seat location sensor 130. The controller 122 may be further configured to determine a leg length of the vehicle occupant 114 based on the seat position of the vehicle occupant 114 and determine the location of the sensitive portion based on the leg length of the vehicle occupant 114. The controller 122 may include a database of leg length of the vehicle occupant 114 based on seat position and location information of the sensitive body portions correlated to the leg length of the vehicle occupant 114. Such a database may be generated based on anthropometric data, such as that contained in Chapter 11 of "Human Engineering Guide to Equipment Design" Harold P Van Cott and Robert G Kinkade, ed., American Institutes for Research, 1972.

Figure 4:
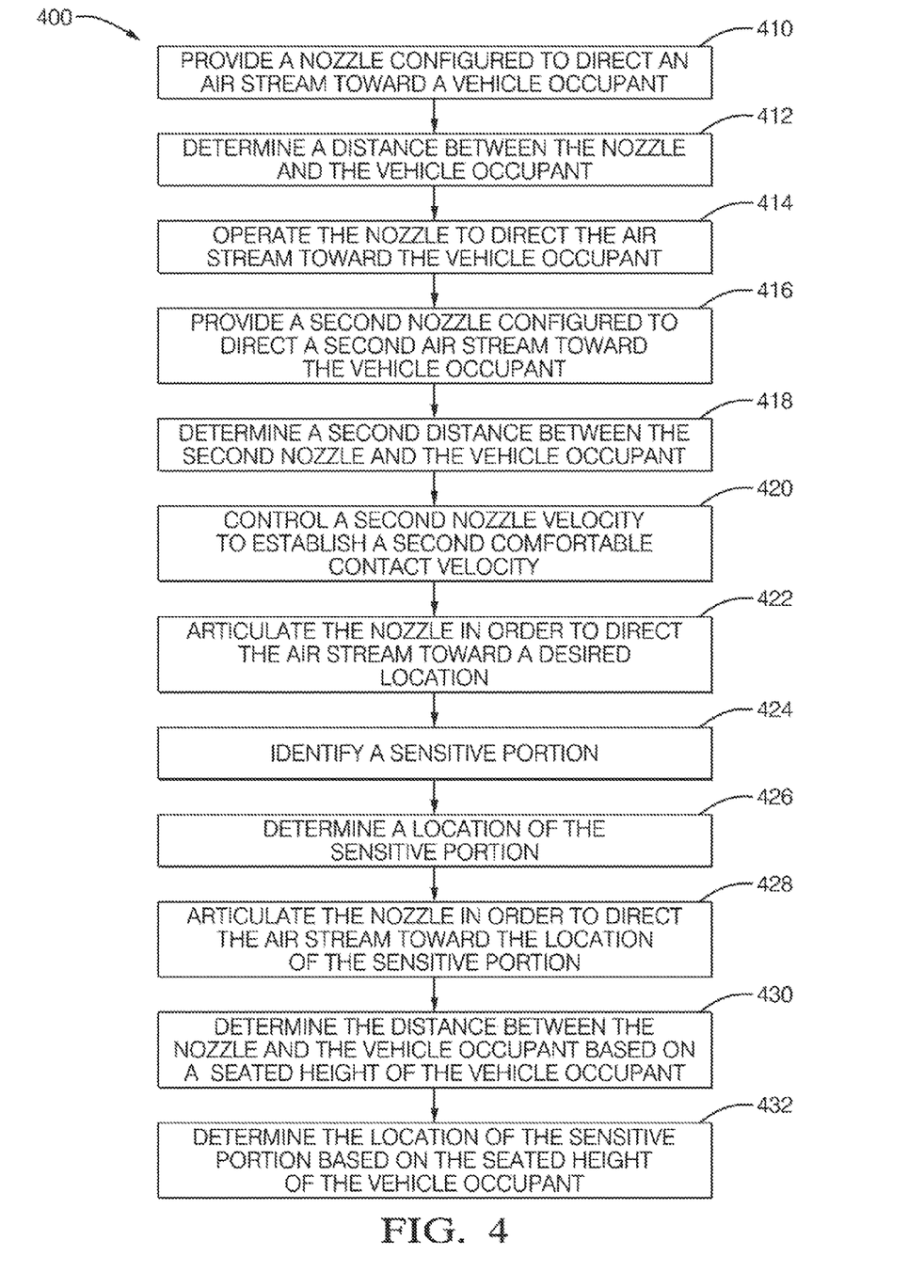
FIG. 4 is a flow chart of a method for controlling a ventilation system in accordance with one embodiment.

FIG. 4 illustrates steps 410 to 420 of a non-limiting method 400 of controlling a ventilation system 100 to provide an air stream 110 to a vehicle occupant 114 seated in a vehicle cabin 116.

Step 410, PROVIDE A NOZZLE CONFIGURED TO DIRECT THE AIR STREAM, includes providing a nozzle 112 configured to direct the air stream 110 from the ventilation system 100 toward a vehicle occupant 114 seated in a vehicle cabin 116.

Step 412, DETERMINE A DISTANCE BETWEEN THE NOZZLE AND A VEHICLE OCCUPANT, includes determining a distance 118 between the nozzle 112 and a vehicle occupant 114. The determination of the distance 118 between the nozzle 112 and the vehicle occupant 114 may be based on determining a location of a seat within the vehicle 120. As a non-limiting example, the seat location may be determined by determining the location of the seat relative to an adjustable seat track.

Step 414, OPERATE THE NOZZLE TO DIRECT THE AIR STREAM TOWARD THE VEHICLE OCCUPANT, may include operating the nozzle 112 to direct the air stream 110 toward the vehicle occupant 114. The air stream 110 is characterized as having a nozzle velocity effective to establish a comfortable contact velocity. The comfortable velocity may be delivered by controlling an exit velocity of the air stream 110 from the nozzle 112. Alternatively, or in addition, the comfortable contact velocity may be delivered by controlling the effective diameter 20 of the nozzle 112. The comfortable contact velocity may be dependent on an air temperature of the air stream 110.

The method 400 may include providing and controlling a plurality of nozzles 112, 140, 144, 148, therefore, the nozzle 112 may be a first nozzle 112, the air stream 110 is a first air stream 110, the distance 118 may be a first distance 118, the nozzle velocity may be a first nozzle velocity, and the comfortable contact velocity may be a first comfortable contact velocity. The method 400 may further include the steps 416 through 420.

Step 416, PROVIDE A SECOND NOZZLE CONFIGURED TO DIRECT A SECOND AIR STREAM TOWARD THE VEHICLE OCCUPANT, may include providing a second nozzle 140 that is configured to direct a second air stream 138, 142, 146 from the system 100 toward the vehicle occupant 114.

Step 418, DETERMINE A SECOND DISTANCE BETWEEN THE SECOND NOZZLE AND THE VEHICLE OCCUPANT, may include determining a second distance between the second nozzle 140, 144, 148 and the vehicle occupant 114.

Step 420, CONTROL A SECOND NOZZLE VELOCITY TO ESTABLISH A SECOND COMFORTABLE CONTACT VELOCITY, may include controlling a second nozzle velocity to establish a second comfortable contact velocity. The first comfortable contact velocity may be distinct from the second comfortable contact velocity.

FIG. 5 illustrates steps 422 to 432 of the method 400 of controlling a ventilation system 100 to provide an air stream 110 to a vehicle occupant 114 seated in a vehicle cabin 116.

Step 422, ARTICULATE THE NOZZLE IN ORDER TO DIRECT THE AIR STREAM TOWARD A DESIRED LOCATION, the method 400 may include articulating the nozzle 112 in order to direct the air stream 110 toward a desired location within the cabin 116 of the vehicle 120. The desired location of Step 422 may be a sensitive portion of a body of the vehicle occupant 114 that is more sensitive to heat loss than other portions of the body. The method 400 may further include the steps 424 through 428.

Step 424, IDENTIFY THE SENSITIVE PORTION, may include identifying a portion of the body of the vehicle occupant 114 that is more sensitive to heat loss than other portions of the body. Identification of the sensitive portion may be based on models of the human body such as the Human Thermal Comfort Model developed by Zhang et al., ibid to determine thermal comfort sensitivity of body portions to the ambient temperature. Step 424, IDENTIFY A SENSITIVE PORTION, may be based on a database containing the temperature sensitivity of various body portions.

Step 426, DETERMINE A LOCATION OF THE SENSITIVE PORTION, may include determining a location of the sensitive portion. The determination may be based on location information regarding the sensitive body portions in relation to the nozzle 112, as a non-limiting example azimuth and distance information. The location information may be generalized so that the location information encompasses the location of the sensitive portion of a female occupant in the $10^{th}$ percentile of height and a male occupant in the $90^{th}$ percentile of height.

Step 428, ARTICULATE THE NOZZLE TO DIRECT THE STREAM TO THE LOCATION OF THE SENSITIVE PORTION, may include articulating the nozzle 112 to deliver the stream to the location of the sensitive portion. The nozzle 112 may be articulated to aim the air stream 110 toward the location of the sensitive portion, e.g. a forehead portion 152. The stream may be characterized as having the stream temperature and the flow rate necessary to establish the desired heat supply rate at the sensitive portion. The method 400 may further include the steps 430 through 432.

Step 430, DETERMINE THE DISTANCE BETWEEN THE NOZZLE AND THE VEHICLE OCCUPANT BASED ON A SEATED HEIGHT OF THE VEHICLE OCCUPANT, may include determining the distance 118 between the nozzle 112 and the vehicle occupant 114 based on a seated height of the vehicle occupant 114. The determination the location of the seated height of the vehicle occupant may be based on the leg length of the vehicle occupant 114. Correlation between the leg length and the location of the sensitive portion may be based on anthropometric data, such as that contained in Chapter 11 of "Human Engineering Guide to Equipment Design" ibid.

Step 432, DETERMINE THE LOCATION OF THE SENSITIVE PORTION BASED ON THE SEATED HEIGHT OF THE VEHICLE OCCUPANT, may include determining the location of the sensitive portion based on the seated height of the vehicle occupant 114. The determination may be based on location information regarding the sensitive body portions in relation to the nozzle 112, as a non-limiting example azimuth and distance information. The location information may be generalized so that the location information encompasses the location of the sensitive portion of a female occupant in the $10^{th}$ percentile of height and a male occupant in the $90^{th}$ percentile of height. The determination of the distance 118 between the nozzle 112 and the vehicle occupant 114 may be based on determining a location of a seat within the vehicle 120. As a non-limiting example, the seat location may be determined by determining the location of the seat relative to an adjustable seat track and determining a leg length of the vehicle occupant based on the seat track position. The determination the location of the seated height of the vehicle occupant may be based on the leg length of the vehicle occupant 114.

Accordingly, a ventilation system 100 and a method 400 of controlling a ventilation system that is configured to an air stream 110 directed toward a vehicle occupant 114 at a comfortable contact velocity is provided. The ventilation system 100 may provide a heated or cooled air stream. The system 100 and method 400 determine the distance 118 between a nozzle 112 of the ventilation system 100 and the vehicle occupant 114 and control a nozzle exit velocity 214 and/or effective nozzle diameter 220 in order to provide the air stream 110 at a comfortable contact velocity 216 when the air stream 110 impinges on the vehicle occupant 114. Providing the air stream 110 at or near the comfortable contact velocity may provide the benefit of delivering the desired heat supply rate with a smaller nozzle 112 and smaller air plenum 126 than may be required if lower air stream velocities are used. This may beneficially reduce the packaging requirements for the nozzle 112 and the air plenum 126 in the vehicle 120. The system 100 may utilize a seat location sensor 130 to determine the distance 118 between the nozzle 112 and the vehicle occupant 114. Utilizing the seat location sensor 130 to determine the distance 118 from the nozzle 112 to the vehicle occupant 114 may provide a cost and vehicle packaging advantage when the vehicle 120 uses a seat location sensor 130 with another vehicle system, e.g. an inflatable restraint system.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A ventilation system configured to provide a plurality of air streams to targeted body parts, the system comprising:
   a plurality of nozzles configured to direct the air streams toward different body parts of a vehicle occupant seated in a vehicle cabin;
   a blower supplying air to the plurality of nozzles;
   a controller including a database storing information of sensitivities of the different body parts and configured to control individual nozzle velocities of the air streams to establish a comfortable contact velocity for the different body parts dependent on a seat position of the vehicle occupant; and
   a seat location sensor configured to communicate the seat position to the controller for determining a distance between the plurality of nozzles and the different body parts of the vehicle occupant.

2. The system of claim 1, wherein the sensor is configured to determine the distance between each nozzle of the plurality of nozzles and the different body parts of the vehicle occupant.

3. The system of claim 2, wherein the sensor is configured to determine the distance between each nozzle of the plurality of nozzles and the different body parts of the vehicle occupant based on waves emitted from the sensor and reflected from the vehicle occupant, wherein the waves are selected from a group consisting of ultrasonic waves and electromagnetic waves.

4. The system of claim 1, wherein the system further includes a servo mechanism coupled to the plurality of nozzles and in communication with the controller, the servo mechanism configured to articulate the plurality of nozzles in order to direct the air stream in a direction determined by the controller.

5. The system of claim 4, wherein the air streams are directed toward a set of body parts of the vehicle occupant that is more sensitive to heat loss than other portions of the body, wherein the controller is configured to
   identify the set of more heat-sensitive body parts,
   determine locations of the set of more heat-sensitive body parts, and
   operate the servo mechanism to articulate the plurality of nozzles to direct the air streams to the locations of the set of more heat-sensitive body parts.

6. The system of claim 5, wherein the controller is configured to determine the distances between the plurality of nozzles and the set of more heat-sensitive body parts of the vehicle occupant based on a relative distance of a vehicle seat from a dashboard accommodating the plurality of nozzles, the controller configured to receive the relative distance from a seat controller.

7. The system of claim 6, wherein the controller includes a database of location information of the sensitive portion correlated to a seat height of the vehicle seat.

8. The system of claim 1,
wherein the plurality of nozzles includes a first nozzle, the air streams include a first air stream, the distance is a first distance, the individual nozzle velocities include a first nozzle velocity, and the comfortable contact velocity is a first comfortable contact velocity,
wherein the system further includes a second nozzle configured to direct a second air stream toward the vehicle occupant,
wherein the sensor is configured to determine a second distance between the second nozzle and one of the different body parts and the controller is configured to control a second nozzle velocity to establish a second comfortable contact velocity,
wherein the first comfortable contact velocity is distinct from the second comfortable contact velocity.

9. A method of controlling a ventilation system to provide a spot cooling air stream, the method comprising the steps of:
storing a database of temperature sensitivities of sensitive body parts of a vehicle occupant;
determining a distance between a nozzle and a respective body part of the vehicle occupant by way of a seat position communicated by a seat location sensor, the respective body part being one of the sensitive body parts;
determining a desired contact velocity for the respective body part;
calculating a required nozzle velocity based on the determined distance to the respective body part, a respective nozzle hydraulic diameter, and the desired contact velocity for the respective body part;
operating the nozzle to target the air stream toward the respective body part, and
operating a blower to generate the required nozzle velocity.

10. The method of claim 9,
wherein the nozzle is a first nozzle, the air stream is a first air stream toward a first respective body part, the distance is a first distance, the nozzle velocity is a first nozzle velocity, and the comfortable contact velocity is a first comfortable contact velocity, wherein the method further includes the steps of
providing a second nozzle configured to direct a second air stream toward a second respective body part,
determining a second distance between the second nozzle and the second respective body part,
controlling a second nozzle velocity to establish a second comfortable contact velocity, and
wherein the first comfortable contact velocity is distinct from the second comfortable contact velocity.

11. The method of claim 9, further including a step of articulating the nozzle to direct the air stream toward a desired location.

12. The method of claim 9, wherein the nozzle velocity is correlated to the desired contact velocity by a mathematic function in the form of a formula, or a table, with the nozzle to body part distance and nozzle hydraulic diameter as parameters.

13. The method of claim 9, further including the steps of
acquiring the seat location from a seat controller;
determining an occupant seated height based on the seat location;
determining a location of a sensitive body part based on the occupant seated height and the seat location; and
calculating the distance between the nozzle and the respective body part.

* * * * *